United States Patent
Aggour et al.

(10) Patent No.: US 6,364,019 B1
(45) Date of Patent: Apr. 2, 2002

(54) METHOD FOR SAND CONTROL IN OIL, GAS AND WATER WELLS

(75) Inventors: Mohamed A. Aggour, Cairo (EG); Sidqi A. Abu-Khamsin; Elsayed A. Osman, both of Dhahran (SA)

(73) Assignee: King Faud University of Petroleum & Minerals, Dhahran (SA)

( * ) Notice: Subject to any disclaimer, the term of this patent is extended or adjusted under 35 U.S.C. 154(b) by 0 days.

(21) Appl. No.: 09/594,727

(22) Filed: Jun. 16, 2000

(51) Int. Cl.$^7$ ............................................. E21B 33/138
(52) U.S. Cl. ........................ 166/294; 166/288; 166/300; 166/401
(58) Field of Search ................................. 166/270, 401, 166/403, 272.6, 288, 294, 295, 292, 300

(56) References Cited

U.S. PATENT DOCUMENTS 3,559,736 A * 2/1971 Bombardieri ............... 166/276
3,871,455 A * 3/1975 Hardy et al. ................ 166/288
4,494,605 A * 1/1985 Wiechel et al. ............. 166/288

* cited by examiner

*Primary Examiner*—David Bagnell
*Assistant Examiner*—Zakiya Walker
(74) *Attorney, Agent, or Firm*—Dougherty & Troxell

(57) ABSTRACT

A method for treating a subterranean sand formation adjacent to a bore hole forms a permeable solid barrier which restrains the movement of sand particles while maintaining the permeability of the formation. The method includes the step of forming a consolidation fluid containing an asphaltene and a hydrocarbon solvent such as naphtha or reformate with a concentration of between about 40–80 grams of asphaltene per 100 ml of solvent. The consolidation fluid is injected into the sand formation to saturate the sand in a zone around the bore hole for a distance of 1 to 2 feet. This is followed by injecting an oxygen-containing gas at a temperature of between about 100° C. to about 150° C. for a period of time of between about 24 to about 72 hours. In one embodiment of the invention, the oxygen concentration of the effluent gas is monitored and the injection of oxygen-containing gas is continued until he oxygen concentration of the effluent gas is equal to the oxygen concentration of the injected gas.

10 Claims, No Drawings

METHOD FOR SAND CONTROL IN OIL, GAS AND WATER WELLS

FIELD OF THE INVENTION

This invention relates to an improved method for sand control in oil, gas and water wells and more particularly to a method for treating subterranean sand formations adjacent to a bore hole. The treatment is for the purpose of forming a permeable solid barrier which restrains the movement of sand particles while maintaining the permeability of the formations.

BACKGROUND FOR THE INVENTION

Production of oil, gas and water from unconsolidated or weakly consolidated formations is normally accompanied by the production of formation sand particles along with the produced fluids. The production of sand with the well fluids poses serious problems such as the erosion of sub-surface and surface production facilities and the accumulation of the sand in the wellbore and surface separators. Several methods such as gravel packing, screens and plastic consolidation have been in use for many years with varying success. However, these methods have several-technical and cost limitations.

Other method s for treating subterranean sand formations which are adjacent bore holes are disclosed in the Canadian Patent No. 700,740 of Marx, and in the U.S. Pat. No. 3,172,468 of Watson et al., U.S. Pat. No. 3,182,722 of Reed, U.S. Pat. No. 3,217,800 of Smith, U.S. Pat. No. 3,388,743 of Engle et al. and U.S. Pat. No. 3,974,877 of Redford. The methods disclosed therein consolidate incompetent formations by in-situ oxidation of heavy crude oil. Such methods are applicable to formations containing bitumen or heavy crude oil and utilize in-situ combustion involving high temperatures.

A Canadian patent No. 713,989 of Goodwin et al. discloses a method for consolidating heavy oil formations by oxidation of the heavy oil at a temperature of between 350 and 500° F. Another Canadian patent No. 1,266,429 of Hanna discloses a method of treating an unconsolidated formation by heating heavy crude oil above ground level. The heated crude oil is then injected into the bore hole to heat the unconsolidated formation adjacent the bore hole to a temperature of between 35°–135° C. (95° F.–275° F.). The elevated temperature supports the low temperature oxidation of the oil contained within the formation. Unheated oxygen containing gas is then injected into the bore hole and into contact with the heated formation to precipitate asphaltenes.

Another method for treating incompetent sand formations is disclosed in U.S. Pat. No. 3,910,351. As disclosed therein, a cavity is formed around a bore hole and 10–80 mesh sand introduced into the cavity. This step is then followed by the injection of bituminous petroleum. An asphalt-precipitating solvent is then injected followed by the injection of a heating fluid to solidify the precipitated asphalt.

In general, the previously mentioned processes use heavy crude oil that are either naturally present in the formation or heated and injected into the formation. In such cases, the oxidation temperature is higher than the formation temperature. Therefore, the processes are applicable to formations that are treated by the in-situ combustion process or in processes which involve extensive heating of the formation, crude oil and air with temperatures higher than the formation temperature. Furthermore, the use of heavy crude oil normally results in a significant loss of permeability and a reduced well productivity.

Accordingly, a prime object of the present invention is to develop a consolidating method using in-situ low-temperature oxidation (LTO) of a hydrocarbon material. This low temperature oxidation is obtained at a temperature close to the formation temperature and produces consolidated sand with a minimum loss of permeability and high compressive strength. This allows the maximum production of oil, gas or water without sand production. Further, the resulting consolidated sand is stable against the flow of formation fluids and other well-treatment fluids such as acids.

Several factors influence the low temperature oxidation process. For example there are the type of hydrocarbon material being oxidized, the oxidation temperature, the oxidation duration, the presence of catalytic materials (such as clay) in the sand and the sand grain size. The effect of these factors on the process can be expressed in terms of the degree of consolidation obtained as measured by the compressive strength of the consolidated sand, the retention of permeability and the stability against formation and treatment fluids.

BRIEF SUMMARY OF THE INVENTION

In essence, the present invention contemplates an improved method for treating subterranean incompetent sand formations adjacent to a well or bore hole. This method or treatment is for the purpose of forming a permeable barrier which restrains the movement of sand particles and at the same time retains a high degree of permeability. The method includes the step of forming a consolidation fluid containing an asphaltene or preferably asphalt and a hydrocarbon solvent such as naphtha, reformate, or other aromatic solvent with a concentration of at least about 40 grams of asphaltene per 100 ml of solvent. In the preferred embodiments of the invention, the concentration of asphalt ranges from about 40 grams to about 80 grams of asphalt per 100 ml of solvent.

The consolidation fluid is then injected into the sand formation to saturate the sand in a zone around the bore hole. For example, the consolidation fluid is injected to saturate the sand for a radial distance of from about 1 to about 2 feet. This saturation step displaces any natural oils or water in the sand formation.

After injecting the consolidation fluid into the sand, an oxygen containing gas such as air is injected into the sand formation. This oxygen containing gas is injected at a temperature of about 100° C. to about 150° C. and preferably at a temperature of about 100° C. The gas injection is continued for a period of time which is sufficient to solidify a thin film of asphaltene on the surface of the sand particles.

In a preferred embodiment of the invention, the method for treating subterranean incompetent sand formation includes the step of monitoring the oxygen content of an effluent gas until the oxygen concentration of the effluent gas is essentially the same as the oxygen concentration of the injected gas. When the oxygen content of the effluent gas is approximately equal to the oxygen content of the injected gas, the injection is stopped and the treatment has been completed.

DESCRIPTION OF THE PREFERRED EMBODIMENTS OF THE INVENTION

The present invention relates to the in-situ consolidation of incompetent sand formations containing crude oil (heavy or light), gas or water. The incompetent sand is consolidated by means of low-temperature oxidation (LTO) of a hydrocarbon material that is either naturally present in or injected into the formation. This treatment creates a consolidated sand matrix around the well bore that has high compressive strength, minimum loss of permeability and stability against formation and well treatment fluids.

Several factors influence the low temperature oxidation process. For this reason, an experimental program was developed. That program will be described with reference to a number of examples. Such examples incorporated small sand packs, 2" diameter by 4" long and 1" diameter by 2.5" long. Different sand grain sizes representing different actual formations were tested. The oxidation was then conducted using different hydrocarbon material compositions, different oxidation temperatures, oxidation duration, different oxygen partial pressure and with and without the presence of catalytic materials in the sand packs. After determining the preferred oxidation (consolidation) conditions, consolidation tests were conducted on a full scale wellbore model resembling commercial wells to test the feasibility of field application of the process. These tests will be described hereinafter.

In one embodiment of the invention, an unconsolidated sand containing crude oil, gas or water was penetrated by a well bore. The unconsolidated sand was then treated by first injecting a slug of a specially prepared hydrocarbon fluid (hereinafter referred to as the consolidating fluid) to displace the naturally present fluid in the sand and saturate a zone around the wellbore extending 1 to 2 feet radially from the well bore. The consolidating fluid is preferably a solution of asphalt in a hydrocarbon solvent such as reformate or naphtha with a specific concentration. The preferred concentration is about 40 grams of asphalt per 100 ml of solvent. Other concentrations of 60 g/100 ml and 80 g/100 ml were also used to provide similar consolidation but with higher loss of permeability. Air at a temperature of 100°0 Celsius was then injected into formation at a low flow rate of three to seven standard liters per minute per foot of sand thickness for a period of time ranging from about 24 to about 72 hours. The asphalt and solution is deposited on the surface of the sand grains and the solvent is displaced deeper into the formation. The low temperature oxidation solidifies the thin film of asphalt on the surface of the sand grains bonding the grains together while the permeability is maintained by the air flow. The loss of permeability is related to the thickness of the asphalt film deposited on the sand grain surface. Therefore, lower concentrations of asphalt in the solvent are preferred.

In another embodiment of the invention, the consolidating fluid comprises a heavy residue from a refinery such as atmospheric column bottom stock. Pure heavy residue is injected directly into the formation to saturate a zone around the wellbore extending for 1 to 2 feet into the formation. For low-permeability formations the refinery residue may be diluted in order to achieve injectivity. The residue is diluted by mixing with native formation oil. For example, the mixture may contain 75% residue and 25% oil or 50% residue and 50% oil.

In yet another embodiment of the invention, the consolidating fluid may comprise the native reservoir oil if it contains the appropriate concentration of asphaltene. Aged native oil is preferred over the freshly produced oil. The aging process results in increasing the concentration of the heavy ends and hence, improves the oxidation process.

In yet another embodiment of the invention, the consolidating fluid is a native reservoir oil which contains an appropriate concentration of asphaltene. Aged native oil is preferred over the freshly produced oil. The aging process results in increasing the concentration of the heavy ends and hence, improves the oxidation process.

The preferred oxidation temperature was found to be about 100 Celsius. However, the temperature may be raised up to about 150 Celsius to speed up the consolidation process without affecting the quality of consolidation.

In another embodiment of the invention, the formation around the wellbore is first cleaned by flushing the formation with a mutual solvent to remove both native oil and water away from the zone around the wellbore. A solvent such as COREXIT 8626 solvent AC (Isopropyl Cellosolve) or Butyl Cellosolve may be used for cleaning the sand formation from oil.

Another embodiment of the invention involves consolidation in wells that have been produced for a period of time during which significant amounts of sand have been produced. In such cases two procedures may be followed. In the first, the cavity around the wellbore may first be packed with sand having a specific grain size. For example, the preferred grain size is six times the size of the 50th percentile of the formation sand. The present consolidation process can then be employed to consolidate the sand that filled the cavity.

In a second procedure, the cavity around the wellbore may be maintained if the casing is not adversely affected, and the present consolidation process is performed on the sand beyond the cavity. This, in fact, may increase the well productivity as the cavity would have the effect of increasing the wellbore radius. In this case, however, the volume of the consolidating fluid injected should be enough to displace the fluid in the cavity and saturate the sand beyond the cavity.

It should also be recognized that in thick formations, the total interval should be divided into smaller zones (10–20 feet thick) and each zone should be consolidated separately with intermediate zone isolations.

The main objective of the present invention is to develop a consolidating method using in-situ LTO at a temperature close to the formation temperature and to produce consolidated sand with a minimum loss of permeability and high compressive strength. Such sand allows for the maximum production of oil, gas or water without sand production. Further, the resulting consolidated sand should be stable against the flow of formation fluids and other well-treatment fluids such as acids.

Factors which influence the LTO process include the type of hydrocarbon material being oxidized, the oxidation temperature, the oxidation duration, the presence of catalytic materials (such as clay) and the grain size of the sand. The effect of these factors on the process can be expressed in terms of the degree of consolidation obtained as measured by the compressive strength of the consolidated sand, the retention of permeability and the stability against formation and treatment fluids.

The following examples are taken from the aforementioned experimental program and illustrate the factors which influence the low oxidation process.

EXAMPLES

1. Four identical sand packs 2" diameter by 4" long were saturated with 40 g asphalt in 100 cc reformate solution and maintained at a temperature of 100 Celsius, under a confining pressure of 3000 psi and a pore pressure of 2500 psi. The conditions of these packs resembled those of a sand formation found a Middle Eastern well. Air at 100° Celsius was injected into the sand packs and the effluent gas was continuously analyzed for its oxygen content. The process was stopped when the oxygen concentration in the effluent gas was the same as that in the injected air. This indicated that the oxidation process was completed.

The permeability of the sand packs was measured and compared to the original permeability before the oxidation process. The permeability retention ranged from 93.5% to 94%. One of the consolidated packs was then tested for its compressive strength and the value obtained was 1820 psi. A second consolidated pack was subjected to a flow of oil and water of about 3000 pore volumes at a differential pressure of 200 psi. No sand was produced. The compressive strength of this pack was then measured at 1828 psi. A third consolidated pack was subjected to a flow of mud acid (3% HF, 12% HCL). After injecting 500 pore volumes without any sand production, the compressive strength of the pack was measured at 1798 psi. The fourth pack was then split into two parts; one part was soaked in crude oil and the second in mud acid for a period of three months. This did not affect the quality of consolidation.

2. Four identical sand packs similar to those used in Example 1 were consolidated in a similar manner but with the consolidating fluid having a composition of 60 g asphalt in 100 cc of reformate. Similar tests were conducted as described in Example 1. Similar results were obtained for compressive strength and stability against acid and formation fluids. However, the permeability retention was a little lower at about 92%.

3. Similar experiments to those described above were conducted with the concentration of the consolidating fluid increased to 80 g asphalt in 100 cc reformate. A slight increase in compressive strength was observed, but it was within experimental error. A decrease in permeability retention was, however, clear.

4. Similar experiments to those described in Example 1 were conducted under the same conditions but with the sand packs containing 4% (by weight) clay. The compressive strength obtained (2050 psi) was higher than that obtained without the presence of clay. However, the permeability retention was about 83%.

5. Similar experiments to those described in Example 1 were conducted under similar conditions but with the presence of Iron Sulfate in the s and packs. The Iron Sulfate being a reaction catalyst, shortened the reaction time by about 30%. No effect on compressive strength or permeability retention was observed.

6. Four experiments similar to those of Example 1 were conducted under the same conditions but with an oxidation temperature of 150° Celsius. The reaction time was reduced by about 20%, the compressive strength was increased by about 5% and no significant effect on permeability retention was observed.

7. Similar sand packs as those of Example 1 were used with the consolidating fluid being a freshly produced Arabian Heavy crude oil and the oxidation temperature of 100 and 150 Celsius. No adequate consolidation was obtained at 100 Celsius while moderate consolidation was obtained at 150 Celsius. The quality of this consolidation, however, was much less than that obtained with the asphalt-reformate solution.

8. Similar experiments as in Example 7 were conducted but with aged Arabian Heavy crude oil as the consolidating fluid. Good consolidation was obtained with compressive strengths in the range of 1500 to 1800 psi and permeability retention of about 92%.

9. Similar experiments as those described above were conducted using the refinery atmospheric bottom stock as the consolidating fluid. Good consolidation was obtained at 150 Celsius; the compressive strength and permeability retention were, however, lower than those obtained with the asphalt-reformate solutions at 100 Celsius.

10. A process demonstration test was performed on a full-scale wellbore model. The model was made of a 7 in. diameter, 8 feet long casing surrounded by a 30 in.-diameter cylindrical retainer. The casing was completed with 0.5 in. perforations (4 perforations per foot). The retainer was also perforated with similar perforations. The model was placed inside an insulated jacket. The annular space between the casing and retainer was packed (using wet packing procedure) with loose sand having a grain size distribution resembling one of the reservoirs in the Middle East. Thermocouples were placed inside the sand to measure the temperature at various locations along the length of the model. The sand was saturated with the consolidating fluid used in Example 1. The model was heated by circulating heating oil through the annular space between the model body and the heating jacket until a uniform temperature of 100 Celsius was obtained within the sand. Air at 100 Celsius was injected into the model through the perforations in the casing and the effluent fluid was produced through the perforations in the retainer. The effluent gas was analyzed for its oxygen concentration. After the oxidation process was completed (72 hours), the consolidated sand was subjected to a back-flow of water at a rate of 44 BBL per day per foot. No sand was produced over a period of 10 days. The model was then disassembled and the consolidated sand pack was visually inspected. The sand was found to be well consolidated all around the casing and along the length of the casing. Cores were taken from the resulting consolidated sand and their compressive strength was measured at above 2000 psi.

While the invention has been described in connection with the preferred embodiments, it should be recognized and understood that changes and modifications may be made therein without departing from the scope of the appended claims.

What is claimed is:

1. A method for treating subterranean incompetent sand formations adjacent to bore holes for the purpose of forming a permeable solid barrier which restrains the movement of said particles, said method comprising the steps of:

a) forming a consolidation fluid containing an asphaltene and a hydrocarbon solvent with a concentration of at least about 40 grams of asphaltene per 100 ml of solvent;

b) injecting the consolidation fluid into the sand formation to saturate the sand in a zone around a bore hole for a radial distance of at least about 1 foot to thereby displace any naturally present fluid in the sand;

c) injecting an oxygen-containing gas at a temperature of at least about 100° C. into the formation at a low flow rate for a period sufficient to solidify a thin film of asphaltene on the surface of the sand particles to bond the particles together while the permeability is maintained by the flow of oxygen-containing gas;

d) whereby a permeable solid barrier is formed which restrains the movement of said particles.

2. A method for treating subterranean incompetent sand formations adjacent the bore holes in accordance with claim 1 wherein said consolidation fluid is injected into the zone around the bore hole to a radial distance of between about 1 and 2 feet.

3. A method for treating subterranean incompetent sand formations adjacent to a bore hole in accordance with claim 2 wherein said consolidation fluid contains asphaltenes and a hydrocarbon solvent with a concentration of between about 40 to about 80 grams of asphalt per 100 ml of solvent.

4. A method for treating subterranean incompetent sand formations adjacent to a bore hole in accordance with claim 3 wherein said asphaltene is asphalt and wherein said oxygen containing gas is injected into the bore hole at a rate of about three to seven standard liters per minute per foot of sand thickness.

5. A method for treating subterranean incompetent said formations adjacent to a bore hole for the purpose of forming a permeable solid barrier which restrains the movement of sand particles, said method comprising the steps of:
   a) forming a consolidation fluid containing an asphaltene and a hydrocarbon solvent with a concentration of at least about 40 grams of asphaltene per 100 ml of solvent;
   b) injecting the consolidation fluid into the sand formation to saturate the sand in a zone around a bore hole for a radial distance of at least about 1 foot to thereby displace any naturally present fluid in the sand;
   c) injecting an oxygen-containing gas at a temperature of at least about 100° C. into the formation at a low flow rate for a period sufficient to solidify a thin film of asphaltene on the surface of the sand particles to bond the particles together while the permeability is maintained by the flow of oxygen-containing gas;
   d) monitoring the oxygen content of an effluent gas;
   e) continuing the injecting of an oxygen containing gas in step c) until the oxygen concentration of the effluent gas is the same as the oxygen concentration of the gas injected in step c);
   f) stopping the injection of an oxygen containing gas; and,
   g) whereby a permeable solid barrier is formed which restrains the movement of sand particles.

6. A method for treating subterranean incompetent sand formations adjacent to a bore hole in accordance with claim 5 wherein the gas injection of steps c) and e) are continued for a period of between about 24 to about 72 hours.

7. A method for treating subterranean incompetent sand formations adjacent to a bore hold in accordance with claim 5 wherein the oxygen containing gas injected into the formation is injected at a temperature of between about 100° C. to about 150° C.

8. A method for treating subterranean incompetent sand formations adjacent to a bore hold in accordance with claim 7 wherein the consolidation fluid is formed with between about 40 grams to about 80 grams of asphalt per 100 ml of hydrocarbon solvent.

9. A method for treating subterranean incompetent sand formations adjacent to a bore hole in accordance with claim 5 which includes the step of cleaning the sand formation by flushing with a solvent to thereby remove natural oil and water before injecting the consolidation fluid.

10. A method for treating subterranean incompetent sand formations adjacent to a bore hole in accordance with claim 5 which includes the step of introducing sand into a cavity around a bore hole with sand having a grain size which is about 6 times the size of the 50th percentile of the formation sand before injecting the consolidation fluid of step b.

* * * * *

UNITED STATES PATENT AND TRADEMARK OFFICE
CERTIFICATE OF CORRECTION

PATENT NO. : 6,364,019 B1  
APPLICATION NO. : 09/594727  
DATED : April 2, 2002  
INVENTOR(S) : Mohamed A. Aggour et al.

Page 1 of 1

It is certified that error appears in the above-identified patent and that said Letters Patent is hereby corrected as shown below:

On the Title page:

Item (75) Inventors: please change "Elsayed" to --El-Sayed--.
Item (73) Assignee: please change "Faud" to --Fahd--.

COLUMN 3
Line 35, please change "0 Celsius" to --Celsius--.

COLUMN 4
Line 12, please change "8626" to --8626,--.
Line 65, please change "found a" to --found in a--.

COLUMN 5
Line 42, please change "s and" to --sand--.

COLUMN 7
Line 9, please change "said" to --sand--.

COLUMN 8
Line 9, please change "hold" to --hole--.
Line 14, please change "hold" to --hole--.

Signed and Sealed this
Thirty-first Day of July, 2012

David J. Kappos
*Director of the United States Patent and Trademark Office*